United States Patent [19]

Itoh

[11] Patent Number: 5,801,662
[45] Date of Patent: Sep. 1, 1998

[54] PORTABLE RADIO DEVICE ANTENNA APPARATUS

[75] Inventor: Ryo Itoh, Tokyo, Japan

[73] Assignee: NEC Corporation, Tokyo, Japan

[21] Appl. No.: 773,352

[22] Filed: Dec. 26, 1996

[30] Foreign Application Priority Data

Dec. 28, 1995 [JP] Japan ................................. 7-344257

[51] Int. Cl.⁶ .................................................. H01Q 1/24
[52] U.S. Cl. .......................... 343/702; 343/725; 343/860; 343/900
[58] Field of Search .................................. 343/702, 900, 343/901, 895, 725, 860; H01Q 1/24

[56] References Cited

U.S. PATENT DOCUMENTS 5,204,687  4/1993  Elliott et al. ........................ 343/702
5,446,469  8/1995  Makino ................................ 343/702

FOREIGN PATENT DOCUMENTS

| 0 688 060 | 12/1995 | European Pat. Off. |
| 54-52450 | 4/1979 | Japan . |
| 64-90604 | 4/1989 | Japan . |
| 2-19004 | 1/1990 | Japan . |
| 4-196907 | 7/1992 | Japan . |
| 6-232614 | 8/1994 | Japan . |
| 2 213 998 | 8/1989 | United Kingdom . |
| 2 296 603 | 7/1996 | United Kingdom . |

Primary Examiner—Michael C. Wimer
Attorney, Agent, or Firm—Young & Thompson

[57] ABSTRACT

A portable radio device antenna apparatus has a retractable antenna element mounted on the casing of a radio device. The antenna element includes a straight element having an electrical length of $\lambda/2$ and a helical coil having an electrical length of $\lambda/4$ and attached to the upper end of the straight element. The casing contains an impedance matching circuit having a pair of terminals and serving to perform impedance matching of the straight element. When the straight element is pulled out from the casing, a feeding metal piece connected to a radio circuit and a lower connection metal piece connected to one terminal of the impedance matching circuit are simultaneously connected to the short-circuit metal fixture of the antenna element, and an upper connection metal piece connected to the other terminal of the impedance matching circuit is brought into contact with the straight element. When the straight element is retracted, the feeding metal piece is brought into contact with a first contact metal fixture connected to the helical coil, and the lower and upper connection metal pieces are respectively brought into contact with an insulator between the straight element and the helical coil and a protective cover which covers the helical coil.

7 Claims, 3 Drawing Sheets

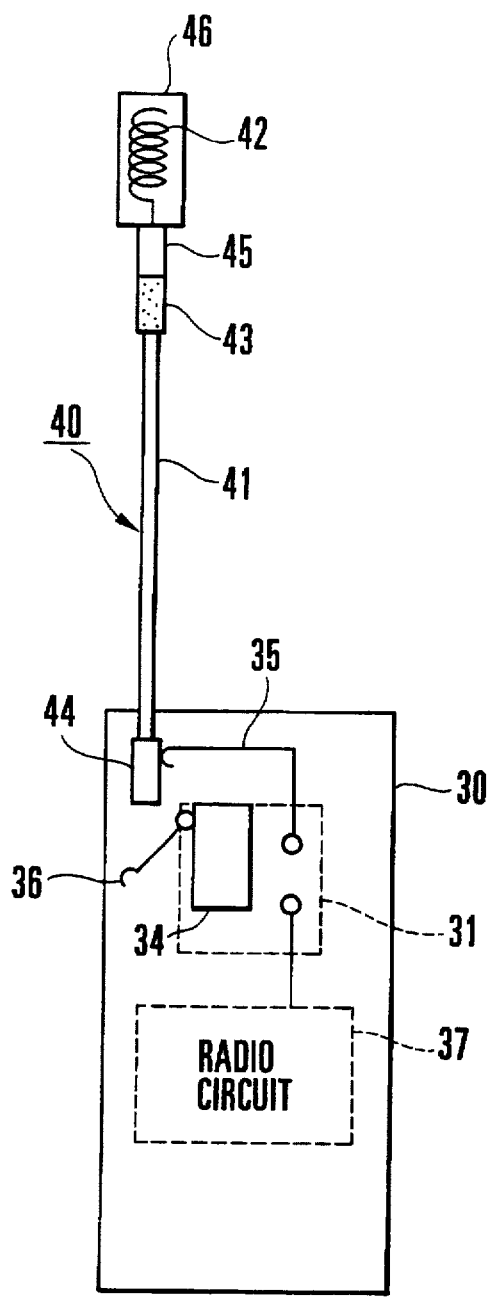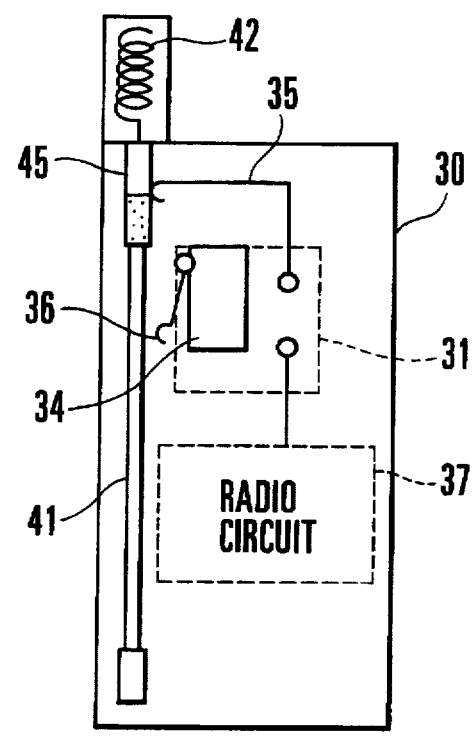
FIG. 2A
PRIOR ART
FIG. 2B
PRIOR ART

PORTABLE RADIO DEVICE ANTENNA APPARATUS

BACKGROUND OF THE INVENTION

The present invention relates to an antenna apparatus having a retractable antenna used for a portable radio device and, more particularly, to a portable radio device antenna which exhibits a sufficiently high gain when retracted and undergoes only a small decrease in gain due to the body of a user when pulled out.

As a portable radio device antenna, an antenna constituted by a straight element having an electrical length of $\lambda/2$ ($\lambda$: wavelength of radio wave) and a helical coil having an electrical length of $\lambda/4$ has been proposed. The helical coil is attached to the distal end of the straight element to be electrically insulated. In a portable radio device antenna having such a structure, since the $\lambda/2$ and $\lambda/4$ elements differ in their input impedances, two types of impedance matching circuits are required.

As shown in FIGS. 2A, 2B, and 3, a conventional antenna apparatus has a mechanical two-way switch to switch impedance matching circuits depending on whether the antenna is pulled out or retracted. With this structure, two types of impedance matching circuits are switched. That is, as shown in FIGS. 2A and 2B, a retractable antenna element 40 is retracted in a casing 30 of a radio device, and an impedance matching circuit 31 is arranged in the casing 30.

As shown in FIG. 3, this impedance matching circuit 31 includes a first matching circuit 32 which operates when the antenna is retracted, a second matching circuit 33 which operates when the antenna is pulled out, and a switch 34 having two-way movable contacts 34a and 34b for switching the first and second matching circuits 32 and 33. A conductive connection metal piece 35 is connected to one terminal of the impedance matching circuit 31, and a radio circuit 37 is connected to the other terminal of the impedance matching circuit 31. The switch 34 has an actuator 36 which operates when an antenna element 40 is retracted in the casing 30.

The antenna element 40 is constituted by a straight element 41 and a helical coil 42 which are coupled to each other through an insulator 43. A conductive connection metal fixture 44 is attached to the lower end of the straight element 41. A conductive connection metal fixture 45 is attached to the lower end of the helical coil 42. A protective cover 46 covers the helical coil 42.

As shown in FIG. 2A, in this portable radio device antenna, when the antenna element 40 is pulled out from the casing 30, the actuator 36 of the switch 34 is set in a non-contact state, and the movable contacts 34a and 34b are connected to the second matching circuit 33. When the antenna element 40 is retracted in the casing 30, the straight element 41 operates the actuator 36 of the switch 34 to switch the switch 34 so as to connect the movable contacts 34a and 34b to the first matching circuit 32.

However, since the above conventional portable radio device antenna uses the mechanical switch having the two movable contacts, the casing 30 needs to have a large volume. A reduction in size of the portable radio device cannot therefore be attained.

Although the present applicant has proposed a portable radio device antenna in Japanese Patent Laid-Open No. 6-232614, this proposed portable radio device antenna has no impedance matching circuit. Other techniques associated with antennas have been disclosed in Japanese Patent Laid-Open Nos. 4-196907, 54-52450, 2-19004, and 64-90604.

SUMMARY OF THE INVENTION

It is an object of the present invention to provide a portable radio device antenna apparatus which serves as a straight element having an electrical length of $\lambda/2$ and exhibits a sufficiently high gain as a helical coil having an electrical length of $\lambda/4$.

It is another object of the present invention to provide a portable radio device antenna apparatus which allows a reduction in size.

In order to achieve the above objects, according to the present invention, there is provided a portable radio device antenna apparatus comprising a casing of a radio device and a retractable antenna element mounted on the casing, the antenna element comprising a rod-like, conductive, straight element having an electrical length of $\lambda/2$, a helical coil having an electrical length of $\lambda/4$ and attached to an upper end of the straight element, an insulator for insulating the straight element from the helical coil, a short-circuit metal fixture mounted on a lower end of the straight element and insulated therefrom, a first contact metal fixture mounted on a lower end of the helical coil and electrically connected to the helical coil, and an insulating protective cover covering the helical coil, and the casing comprising an impedance matching circuit having a pair of terminals and serving to perform impedance matching of the straight element, upper and lower connection metal pieces respectively connected to a pair of terminals of the impedance matching circuit, and a feeding metal piece connected to a radio circuit for transmitting/receiving a radio signal, wherein when the straight element is pulled out from the casing, the feeding metal piece and the lower connection metal piece are simultaneously connected to the short-circuit metal fixture, and the upper connection metal piece is brought into contact with the straight element, and when the straight element is retracted in the casing, the feeding metal piece is brought into contact with the first contact metal fixture, and the lower and upper connection metal pieces are respectively brought into contact with the insulator and the protective cover.

BRIEF DESCRIPTION OF THE DRAWINGS

FIG. 2A is a schematic view showing a state in which the antenna element of a conventional portable radio device antenna apparatus is pulled out;

FIG. 2B is a schematic view showing a state in which the antenna element is retracted.

DESCRIPTION OF THE PREFERRED EMBODIMENT

The present invention will be described in detail below with reference to the accompanying drawings.

Figure 1B:
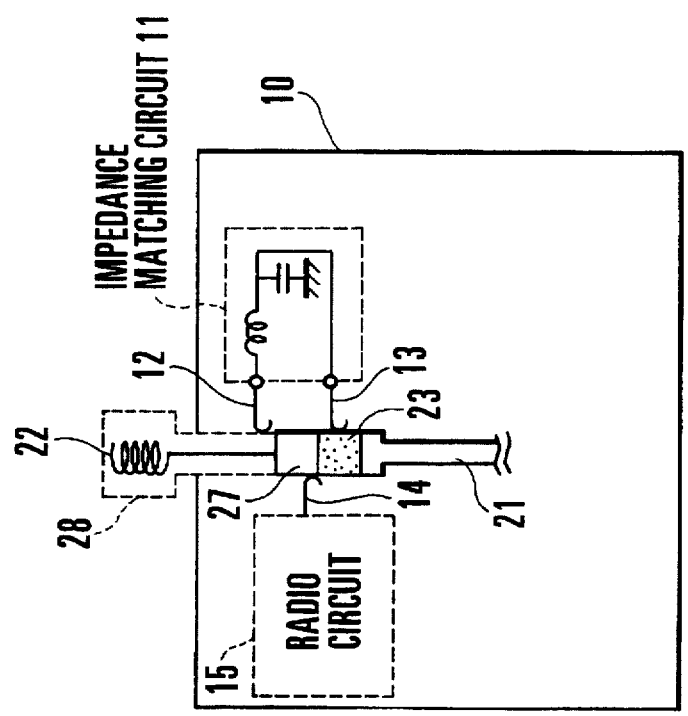
FIG. 1B is a schematic view showing a state in which the antenna element is retracted.
Figure 1A:
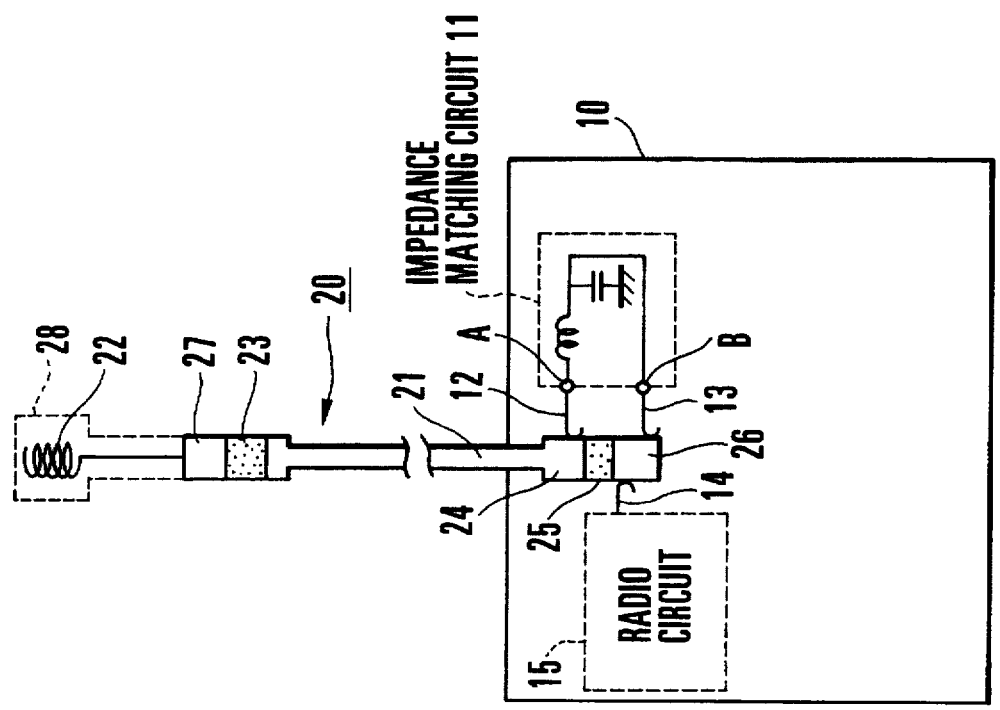
FIG. 1A is a schematic view showing a state in which the antenna element of a portable radio device antenna apparatus according to an embodiment of the present invention is pulled out.
Figure 3:
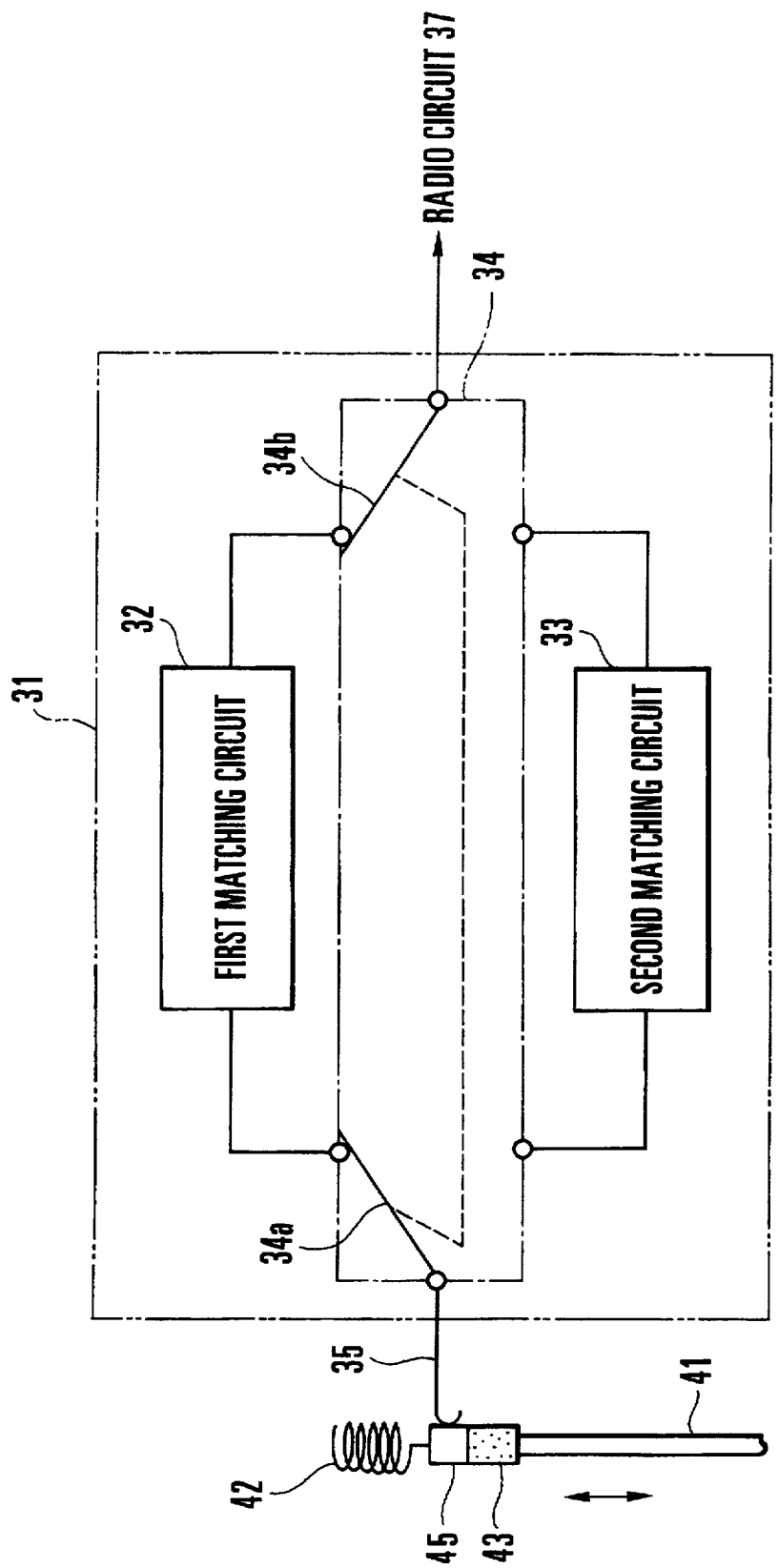
FIG. 3 is a block diagram showing an impedance matching circuit used in the conventional portable radio device antenna apparatus shown in FIGS. 2A and 2B.

FIG. 1A shows a state in which the antenna element of a portable radio device antenna according to an embodiment of the present invention is pulled out. FIG. 1B shows a state in which the antenna element is retracted. Referring to Fig. 1A, reference numeral 10 denotes the casing of a portable radio device, on which a retractable antenna element 20 is mounted. This antenna element 20 includes a rod-like, conductive, straight element 21 having an electrical length of λ/2 and a helical coil 22 mounted on the upper end of the straight element 21, consisting of a conductive material, and having an electrical length of λ/4. The straight element 21 is electrically disconnected from the helical coil 22 through an insulator 23.

A contact metal fixture 24 is attached to the lower portion of the straight element 21 to be in contact therewith. The contact metal fixture 24 is electrically connected to the straight element 21. A short-circuit metal fixture 26 is mounted on the lower end of the contact metal fixture 24 through an insulator 25.

A contact metal fixture 27 is attached to the lower end of the helical coil 22 to be in contact therewith. The contact metal fixture 27 is electrically connected to the helical coil 22. The contact metal fixture 27 is mounted on the upper end of the insulator 23 interposed between the straight element 21 and the helical coil 22. The straight element 21 and the contact metal fixture 27 are electrically insulated from each other through the insulator 23. Reference numeral 28 denotes a cap-like protective cover consisting of a synthetic resin and covering the helical coil 22.

Reference numeral 11 denotes an impedance matching circuit arranged in the casing 10. Connection metal pieces 12 and 13, each made of a conductive metal in the form of a leaf spring, are respectively connected to terminals A and B of the impedance matching circuit 11. The connection metal pieces 12 and 13 are arranged side by side in the axial direction of the antenna element 20. The connection metal piece 12 on the upper side is brought into contact with the antenna element 20. Reference numeral 14 denotes a feeding metal piece made of a conductive metal in the form of a leaf spring and electrically connected to a radio circuit 15. The feeding metal piece 14 is placed at a middle position between the connection metal pieces 12 and 13 to be in contact with the antenna element 20.

The impedance matching circuit 11, the connection metal pieces 12 and 13, and the feeding metal piece 14 are fixed inside the casing 10. The lower half portion of the protective cover 28, the contact metal fixture 27, the insulator 23, the contact metal fixture 24, the insulator 25, and the short-circuit metal fixture 26 have columnar shapes having the same diameter which is larger than the diameter of the straight element 21.

An operation performed when the antenna element 20 is pulled out from the casing 10 will be described next with reference to FIG. 1A. While the antenna element 20 is pulled out from the casing 10, the feeding metal piece 14 connected to the radio circuit 15 is in contact with the short-circuit metal fixture 26. At the same time, the connection metal piece 13 is brought into contact with the short-circuit metal fixture 26. The short-circuit metal fixture 26 is connected to the impedance matching circuit 11 through the connection metal piece 13 and the terminal B. The impedance matching circuit 11 is connected to the contact metal fixture 24 of the straight element 21 through the terminal A and the connection metal piece 12. As a result, power is supplied from the radio circuit 15 to the straight element 21 through the short-circuit metal fixture 26, the impedance matching circuit 11, and the contact metal fixture 24.

At this time, the helical coil 22 is electrically insulated from the straight element 21 through the insulator 23 so only the straight element 21 operates as an antenna. Therefore, the antenna element 20 operates as a whip antenna consisting of the straight element having an electrical length of λ/2, but is not influenced by the helical coil 22.

An operation performed when the antenna element 20 is retracted in the casing 10 will be described below with reference to Fig. 1B. While the antenna element 20 is retracted in the casing 10, the feeding metal piece 14 connected to the radio circuit 15 is connected to the contact metal fixture 27 connected to the helical coil 22. Since the connection metal piece 12 is brought into contact with the outer surface of the protective cover 28, the terminal A of the impedance matching circuit 11 is electrically insulated from the helical coil 22. Since the connection metal piece 13 is brought into contact with the insulator 23, the terminal B of the impedance matching circuit 11 is electrically insulated from both the helical coil 22 and the straight element 21. At this time, since the straight element 21 and the helical coil 22 are electrically insulated from each other through the insulator 23, only the helical coil 22 operates as an antenna.

With this operation, power is supplied from the radio circuit 15 to the helical coil 22 through the feeding metal piece 14 and the contact metal fixture 27. Note that since the helical coil 22 has an impedance of about 50 Ω, no impedance matching circuit is required. In addition, since the contact metal fixtures 24 and 27 and the short-circuit metal fixture 26 have the same diameter, no contact failure occurs with respect to the connection metal pieces 12 and 13 and the feeding metal piece 14.

As has been described above, according to the portable radio device antenna, switching/power feeding of/for the straight element having an electrical length of λ/2 and the helical coil having an electrical length of λ/4 can be performed with a simple structure without using any mechanical switch, thereby realizing a reduction in size of a portable radio device.

what is claimed is:

1. A portable radio device antenna apparatus comprising a casing of a radio device and a retractable antenna element mounted on said casing, said antenna element comprising:
a rod-like, conductive, straight element having an electrical length of λ/2;
a helical coil having an electrical length of λ/4 and attached to an upper end of said straight element;
an insulator for insulating said straight element from said helical coil;
a short-circuit metal fixture mounted on a lower end of said straight element and insulated therefrom;
a first contact metal fixture mounted on a lower end of said helical coil and electrically connected to the helical coil; and
an insulating protective cover covering said helical coil, and said casing comprising:
an impedance matching circuit having a pair of terminals and serving to perform impedance matching of said straight element;
upper and lower connection metal pieces respectively connected to a pair of terminals of said impedance matching circuit; and
a feeding metal piece connected to a radio circuit for transmitting/receiving a radio signal,
wherein when said straight element is pulled out from said casing, said feeding metal piece and said lower connection metal piece are simultaneously connected to said short-circuit metal fixture, and said upper connection metal piece is brought into contact with said straight element, and when said straight element is retracted in said casing, said feeding metal piece is brought into contact with said first contact metal fixture, and said lower and upper connection metal pieces are respectively brought into contact with said insulator and said protective cover.

2. An apparatus according to claim 1, wherein each of said upper and lower connection metal pieces and said feeding metal piece is made of a conductive metal in the form of a leaf spring.

3. An apparatus according to claim 1, wherein said antenna element further comprises a second contact metal fixture which is mounted on a lower end of said straight element and electrically connected to said straight element, and with which said upper connection metal piece is brought into contact.

4. An apparatus according to claim 3, wherein said first and second contact metal fixtures and said short-circuit metal fixture have the same diameter which is larger than a diameter of said straight element.

5. An apparatus according to claim 1, wherein said feeding metal piece is placed at a middle position between said upper and lower connection metal pieces.

6. An apparatus according to claim 1, wherein when said antenna element is pulled out from said casing, power is supplied from said radio circuit to said straight element through said feeding metal piece, said short-circuit metal fixture, said lower connection metal piece, said impedance matching circuit, and said upper connection metal piece.

7. An apparatus according to claim 1, wherein when said antenna element is retracted in said casing, power is supplied from said radio circuit to said helical coil through said feeding metal piece and the first contact metal fixture.

* * * * *